United States Patent [19]

Ronning et al.

[11] 4,242,162
[45] Dec. 30, 1980

[54] TAPE APPLYING DEVICE AND METHOD

[75] Inventors: Albert J. Ronning, North Oaks; William H. Edwards, Vadnais Heights; Dee L. Johnson, Woodbury, all of Minn.

[73] Assignee: Minnesota Mining and Manufacturing Company, St. Paul, Minn.

[21] Appl. No.: 37,240

[22] Filed: May 8, 1979

[51] Int. Cl.³ .................. B29C 17/04; B29C 17/00; B32B 31/00
[52] U.S. Cl. .................... 156/212; 156/286; 156/382; 156/267; 156/522
[58] Field of Search .............. 156/212, 285, 286, 522, 156/382, 267

[56] References Cited

U.S. PATENT DOCUMENTS

| | | | |
|---|---|---|---|
| 3,026,232 | 3/1962 | Finch | 156/212 |
| 3,264,157 | 8/1966 | Lattimer | 156/212 |
| 3,329,545 | 7/1967 | Hamilton | 156/285 |
| 3,393,291 | 7/1968 | Tucker | 156/515 |

Primary Examiner—Douglas J. Drummond
Attorney, Agent, or Firm—Cruzan Alexander; Donald M. Sell; William L. Huebsch

[57] ABSTRACT

A device for applying pressure sensitive adhesive coated tape smoothly over a major surface of a lens blank. The lens blank is positioned on a lens blank support member in an opening in a tape support member, tape is clamped over the opening, and the tape and lens blank support members are moved relative to each other to bring the tape and surface of the lens blank into even smooth engagement with each other.

8 Claims, 6 Drawing Figures

U.S. Patent  Dec. 30, 1980  Sheet 2 of 2  4,242,162
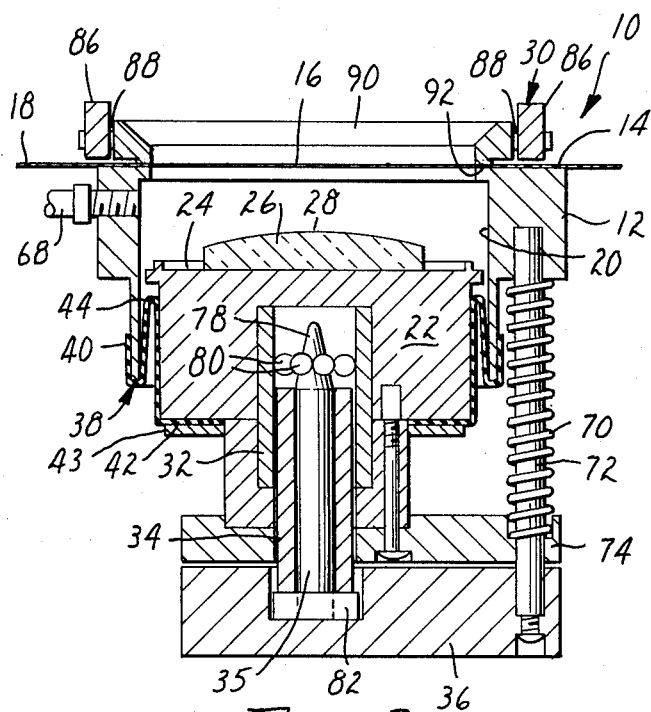
FIG. 3
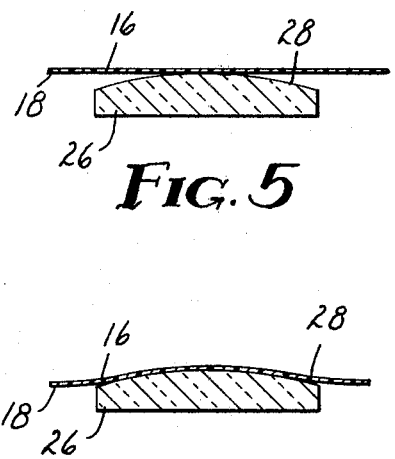
FIG. 5
FIG. 6
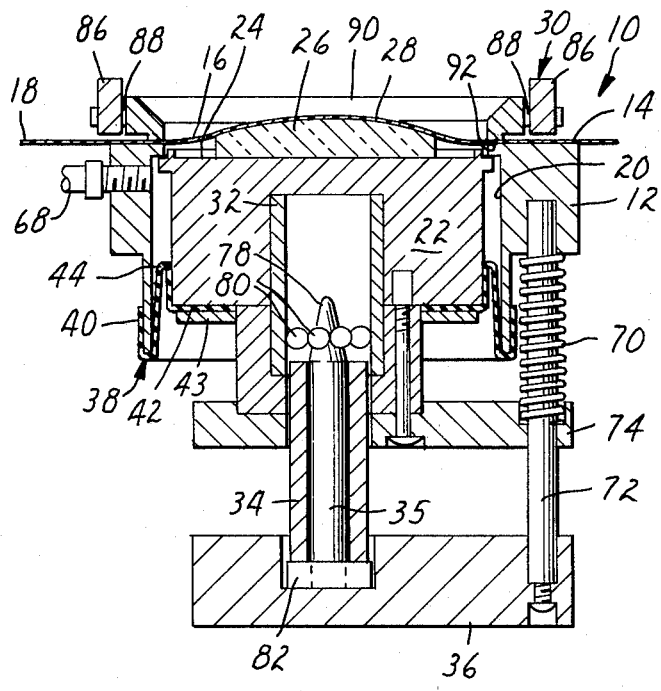
FIG. 4

TAPE APPLYING DEVICE AND METHOD

BACKGROUND OF THE INVENTION

The present invention relates to devices and methods for applying tape to surfaces.

One known method for forming a lens of glass or polymeric material for use in a pair of eye glasses is to first form a first major surface on a lens blank for the lens. The first major surface can be made planar but most often is made generally convex, and when it is formed on a polymeric lens blank can have discontinuities when the lens is to be of the "bifocal" or "trifocal" type including portions having different focal lengths. A piece of special pressure-sensitive adhesive-coated tape is then adhered over the finished first major surface (i.e., such as the tape described in U.S. patent application Ser. No. 36,878, filed concurrently herewith, the content whereof is incorporated herein by reference), and a block is centrally affixed to the outer surface of the tape via a low melting temperature metal composition. The block is then engaged in machines that form a properly shaped second major surface (which is normally concave) on the side of the lens blank opposite the tape, after which the block is removed and the tape is peeled away from the finished lens.

To produce an accurate lens by this method it is important that the tape be smoothly applied to the lens blank to ensure firm attachment of the block by the metal composition, and (particularly to produce an accurate polymeric lens) that no air be trapped between the tape and the lens blank so that the block via the metal composition can give complete support to the first major surface formed on the lens blank. If air is present so that such support is not provided, the operation for forming the second major surface on a polymeric lens blank can distort the lens blank, which distortion results in imperfections in the lens.

Prior to the present invention the only known methods of applying the tape were either manually tensioning the tape across while pressing the tape against the first major surface for the lens blank, which method is difficult and tedious to perform and produces results which vary greatly depending upon applier's patience and skill; or pressing the tape against the first major surface for the lens via a soft comformable resilient elastic member that conforms to the major surface to press the tape into position.

SUMMARY OF THE INVENTION

According to the present invention, there is provided a method for consistently applying pressure-sensitive, adhesive coated tape to a major surface of a lens blank smoothly and evenly, and a device by which that method can be quickly and consistently practiced without significant reliance on the expertise of the operator.

The device according to the present invention includes a tape support member having a tape support surface adapted to support the tape to be applied and having a generally central opening through the tape support surface; a lens blank support member recessed within the central opening and having a lens blank support surface adapted to support a lens blank within the opening; means for clamping the tape to the support surface over the opening; and means mounting the support members for relative movement to move the support surfaces toward each other from a load position. In the load position the lens blank support surface is spaced from the tape support surface so that a lens blank can be placed on the lens blank support surface with a first major surface of the lens blank adjacent and recessed from the tape support surface. After the lens blank is thus positioned, the tape can be positioned on and clamped against the tape support surface. The support positions are then moved relative to each other so that the first major surface of the lens blank contacts the tape and the tape is applied smoothly and evenly along the first major surface of the lens blank, and the tape is cut around the lens blank to free the taped lens blank for removal from the device.

The movement of the support members relative to each other can be done manually by moving either or both of the support members. Preferably, however, such relative movement is provided by power means included in the device which power means may be powered by an external power source (such as high or low pressure fluid or electricity), and the device further includes stop means for stopping relative movement between the support members when a portion of the tape is fully applied to the first major surfaces of lens blanks regardless of the thicknesses of the lens blanks.

In a preferred embodiment of the device illustrated herein and including such power and stop means, the opening extends through the tape support member. The power means includes means for providing an air tight seal between the support members, and vacuum means for lowering the air pressure in the opening between the means for providing a seal and the tape clamped to the tape support surface so that atmospheric pressure acting on the lens blank support member and the tape over the opening will provide a force to cause relative movement between the support members, which force decreases as the tape is applied to the first major surface of the lens blank. Also, the device includes means for biasing the support members toward their load position with a force that, in combination with the force provided by tension in the tape, about equals and opposes the force exerted by atmospheric pressure to bias the lens blank against the tape when the tape is fully applied so that when the tape is fully applied relative movement of the support members will stop; and means for releasably latching the support members in that position in opposition to the biasing means so that the air pressure in the opening can be returned to atmospheric pressure as the tape is cut around the lens blank and the lens blank can be removed from the device before the support members are allowed to return to their loading positions under the influence of the biasing means.

BRIEF DESCRIPTION OF THE DRAWING

The present invention will be further described with reference to the accompanying drawing wherein like numbers refer to like parts in the several views and wherein:

FIGS. 3 and 4 are sectional views taken approximately along lines 3—3 of FIG. 1 which illustrate sequential positions of a lens blank support member in the device during the application of tape to a lens blank via the device; and FIGS. 5 and 6 are fragmentary views that sequentially illustrate the contact of tape being applied to a lens blank by the device.

DESCRIPTION OF THE PREFERRED EMBODIMENT

Figure 1:
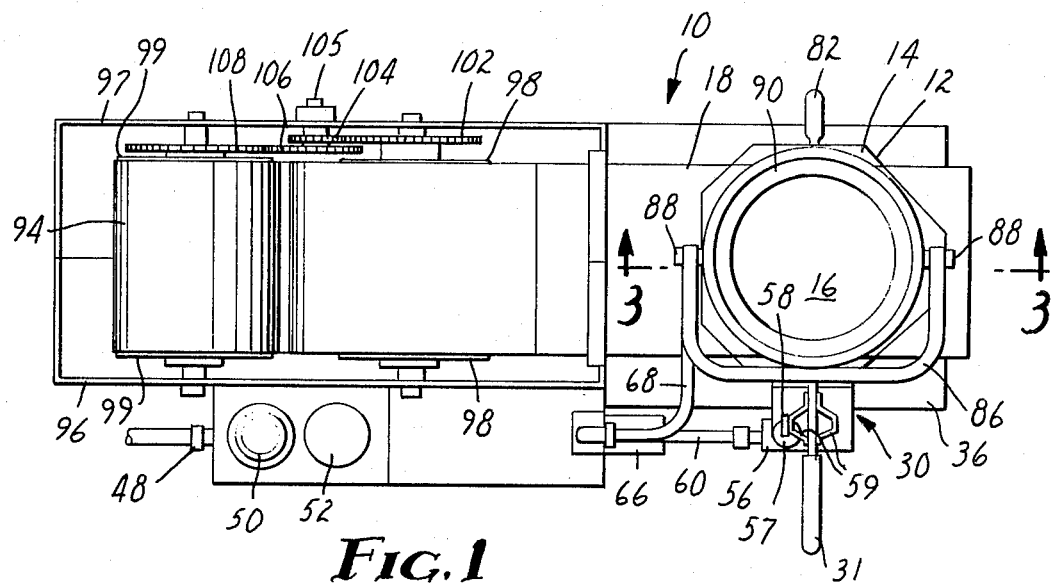
FIG. 1 is a top view of a device according to the present invention.
Figure 2:
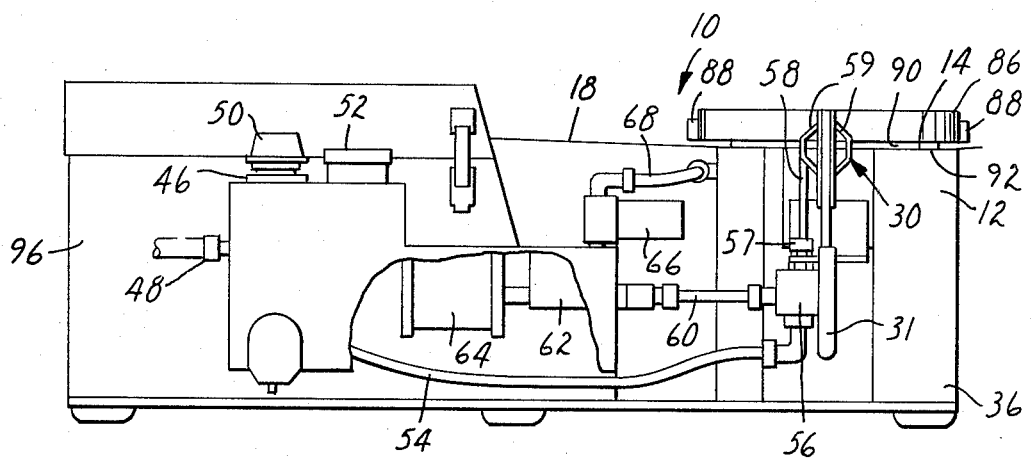
FIG. 2 is a side view of the device of FIG. 1 having parts broken away to show details.

Referring now to the drawing, there is illustrated a device 10 according to the present invention for use in practicing a method according to the present invention for applying tape to lens blanks.

Briefly, as is best seen in FIGS. 3 and 4, the device 10 comprises a tape support member 12 having a tape support surface 14 adapted to support a portion 16 of a supply length of tape 18 and having a generally central opening 20 through the tape support member 12 and tape support surface 14; a generally cylindrical lens blank support member 22 within the central opening 20 having a lens blank support surface 24 adapted to support a lens blank 26 with a first major surface 28 of the lens blank 26 to which the portion 16 of the tape 18 is to be applied adjacent the tape support surface 14; and means, in the form of a releasable clamp assembly 30 manually operated via a handle 31 (FIG. 1) for clamping the portion 16 of the tape 18 to the support surface 14 over the opening 20. Also included are means mounting the support members 12 and 22 for relative movement to move the support surfaces 14 and 24 toward each other from a load position (FIG. 3), which means are provided by axial sliding engagement of the cylindrical inner surface of a hollow tube 32 fixed in the lens blank support member 22 along the cylindrical outer surface of a tube 34 slidably mounted on a pin 35, which pin 35 has an end opposite the lens blank support member 22 fixed on a frame 36 of the device 10 on which frame 36 the tape support member 12 is also fixed. In the load position (FIG. 3) the support surfaces 14 and 24 are spaced from each other to afford first positioning the lens blank 26 on the lens blank support surface 24 and then positioning the portion 16 of the tape 18 on the tape support surface 14 over the opening 20 with the first major surface 28 of the lens blank 26 spaced from the tape portion 16. During such movement of the lens blank and tape support surfaces 14 and 24 toward each other, the first major surface 28 of the lens blank 26 will progressively contact the part of the clamped tape portion 16 over the opening and the tape will be smoothly deformed and applied across the first major surface 28 of the lens blank 26 as is sequentially illustrated in FIGS. 5, 6 and 4.

Also, the device 10 includes power means powered by an external source of compressed air and adapted to be manually actuated for causing the relative movement between the lens blank and tape support surfaces 24 and 14; means for stopping relative movement between the lens blank and tape support members 12 and 22 when the tape portion 16 is fully applied across the first major surface 28 of the lens blank 26 regardless of the thickness of the lens blank 26; and means for releasably retaining the support members 12 and 22 in the position at which they are stopped during application of the tape portion 16 so that the applied tape can be severed around the edge of the lens blank 26 and the lens blank 26 can be removed from the device 10.

The power means for causing the relative movement between the lens blank 26 and tape support surfaces 24 and 14 includes a flexible circular diaphragm 38 that provides an air tight seal between the tape and lens blank support members 12 and 22. The diaphragm 38 has an outer edge portion 40 fixed to the tape support member 12 adjacent its end opposite the tape support surface 14, an inner edge portion 42 clamped via an annular ring 43 to the end of the lens blank support member 22 opposite the lens blank support surface 24, and a central cuff-like portion 44 which projects between the support members 12 and 22 and has a U-shaped bend that moves along the diaphragm 38 between its edge portions 40 and 42 to allow the support members 12 and 22 to move relative to each other. Also included are means for lowering the air pressure in the opening 20 between the diaphragm 38 and lens blank support member 22 and the portion 16 of the tape 18 clamped to the tape support member 12 so that atmospheric air pressure acting on the lens blank support member 22, diaphragm 38 and the portion 16 of the tape 18 over the opening 20 will provide a force to cause relative movement between the support members 12 and 22 which force will decrease as the tape portion 16 is applied to the first major surface 28 of the lens blank 26.

The means for lowering the air pressure in the opening 20 includes an air pressure regulator 46 to which can be coupled an external source of high pressure air through a male quick release coupling portion 48. The regulator 46 can be adjusted via a knob 50 to provide air at a pressure indicated in a gauge 52 through a line 54 to a normally closed spring return spool valve 56. The valve has a projecting activator 57 positioned to be contacted and depressed by a bar 58 fixed to one of two linking arms 59 included in the clamp assembly 30 when the clamp assembly 30 is closed via the handle 31. When opened, the valve 56 allows air to flow through the valve 56 and a line 60 to a venturi type vacuum transducer 62 from which the air is exhausted through a muffler 64. Air passing through the vacuum transducer 62 will cause air to be evacuated from the opening 20 through a filter assembly 66 and an air line 68.

Thus, when an air source is coupled to the coupling portion 48 and the clamp handle 31 is closed so that the valve 56 is opened, the transducer 62 will lower the air pressure in the opening 20 so that atmospheric air pressure will move the lens blank support member 22 to engage the first major surface 28 of the lens blank 26 with the tape portion 16. As the lens blank 26 engages the tape portion 16, the amount of force moving the lens blank support member 22 will decrease due to the decrease in the area across the lens blank support surface 24 exposed to the reduced air pressure in the opening 20. When the tape portion 16 is entirely applied across the first major surface 28 of the lens blank 26, the force exerted by atmospheric pressure on the lens blank support member 22 will be about equalled by the forces exerted by tension in the tape portion 16 between the lens blank 26 and clamp assembly 30, and the compression of three springs 70, each of which springs 70 is coiled around one of three rods 72 included in the frame 36 and spaced around the tape support member 12 (only one of which rods 72 is shown), which springs 70 are compressed between the tape support member 12 and a plate 74 fixed to the lens blank support member 22 and slideable along the rods 72. Thus, movement of the lens blank support member 22 will stop when the tape portion 16 is applied across the first major surface 28 of the lens blank 26.

The means for releasably retaining the tape and lens blank support members 12 and 22 in the position at which they are stopped during application of the tape portion 16 so that the applied tape can be severed around the edge of the lens blank 26 and the taped lens blank 26 can be removed from the device 10 is best seen in FIGS. 3 and 4. The pin 35 which projects through the center of the bearing tube 34 has a conical end portion 78 with a hardened surface. A plurality of bearing balls 80 are disposed around the conical end portion 78 and the inner cylindrical surface of the tube 32. Upward movement of the lens blank support member 22 will cause the balls 80 to move toward a more narrow portion of the end portion 78, and thus the balls 80 will not interfere with such movement. Upon slight movement of the lens blank support member 22 away from the tape support surface 14, however, the balls 80 will jam between the tapered end portion 78 and surface of the tube 32 to prevent such movement. When it is subsequently desired to allow movement of the lens blank support member 22 away from the tape support surface 14, however, this can be accomplished by manually engaging a projecting end of a lever 82 pivotably mounted on the frame 36, which lever 82 has an opposite end portion under an end of the tube 34. Such pivoting of the lever 82 will cause the tube 34 to be moved upwardly so that its upper end will displace the balls 80 from between the conical end portion 78 and the inner wall of the tube 32 and allow the lens blank support member 22 to return to the load position of the members 12 and 22 under the influence of the spring 70 and the weight of the lens blank support member 22.

The clamp assembly 30 mounted on the side of the tape support member 12 by which the tape 18 is clamped to the tape support surface 14 includes an actuating mechanism of the over center type commercially designated Model No. 317-S and available from The De-Sta-Co. Division of Dover Corp., Detroit, Mich., which activating mechanism includes the handle 31 and the linking arms 59. The actuating mechanism is modified (in addition to adding the bar 58 for activating the valve 56) by adding a Y-shaped yoke 86 and an annular ring 90 having trunnions 88 projecting from opposite sides, which trunnions 88 are pivotably mounted in end portions of the yolk 86. The ring 90 has a surface 92 adapted to engage tape on the tape support surface 14 and is movable via the activating mechanism 84 from a position at which the surface 92 clamps the tape portion 16 against the tape support surface 14, and a position (not shown) spaced from one side of the tape support surface 14 so that tape 18 can be removed from or applied to the tape support surface 14.

Also included in the device 10 is means for supporting a supply length of the tape 18 adjacent one edge of the tape support surface 14 from which tape 18 can be manually pulled and positioned over the tape support surface 14, and means for removing a releasable liner 94 from the tape 18 as the tape 18 is pulled toward the tape support surface 14.

The frame 36 has spaced upwardly projecting wall portions 96 and 97 on which are rotatably supported opposed hubs 98 adapted to frictionally engage within a core on which a supply length of the tape 18 to which liner is adhered is wound and from which the tape 18 can be pulled over the tape support surface 14. Two opposed hubs 99, also rotatably supported on the wall portions 96 and 97, are adapted to frictionally engage within a core on which the liner 94 can be wound by hub drive means driven by rotation of the hubs 98 when the tape is manually withdrawn. The hub drive means includes a spur gear 102 on one of the hubs 98 meshed with a gear 104 rotatably mounted on a shaft 105 fixed to the wall portion 97 and coupled via a slip clutch with a gear 106 also rotatably mounted on the shaft 105 and meshed with a gear 108 on one of the hubs 99. The gears 102, 104, 106 and 108 are selected to cause more rotation of the hub 99 than is required to wind the liner 94 when the tape 18 is pulled from the hub 98 so that the clutch will slip and provide both driving force to wind the liner 94 and a tension force to both remove the liner 94 from the tape 18 and wind it tightly on the core. The wall portion 97 can be pivoted about a hinge adjacent the tape support member 22 (not shown) to separate it from the wall portion 96 and afford supplying or removing supply rolls of the liner tape and empty cores for the device 10.

OPERATION

The method for applying pressure-sensitive adhesive tape smoothly over the first major surface 28 of the lens blank 26 will now be explained assuming the lens blank support member 22 is initially in its load position, no tape 18 is positioned on the tape support surface 14, the clamp assembly 30 is released so that the ring 90 is spaced from the tape support surface 14, and a high pressure air supply is connected to the coupling portion 48.

First, the lens blank 26 is positioned in the opening 20 on the lens blank support surface 24 with its first major surface 28 upward. The tape 18 is then manually pulled over the opening 20 and a portion 16 thereof is centered over the opening and adhered to the tape support surface 14, and the ring 90 is manually positioned adjacent and then clamped against the tape portion 16 on the tape support surface 14 by manual manipulation of the handle 31. Upon closing of the clamp assembly 30, the bar 58 on the adjacent linking arm 59 engages and opens the valve 56 so that air flows through the transducer 62 and evacuates air from the opening 20 through the line 68. Such lowered pressure causes atmospheric air pressure to move the lens blank support member 22 toward the tape support surface 14 so that the first major surface 28 of the lens blank 26 engages the tape portion 16 to deform the tape portion 16 and evenly and smoothly apply the tape portion 16 to the first major surface 28. During such movement the force applied to the lens blank support member 22 by the low pressure air in the opening 20 will decrease as application of the tape portion 16 decreases the area of the lens blank support surface 24 adjacent the lower pressure air, so that the force provided by tension in the tape portion 16 between the lens blank 26 and the clamp ring 90 and the force of the springs 70 compressed by movement of the lens blank support member 22 will stop movement of the lens blank support member 22. The operator can then sever the tape portion 16 around the edge of the lens blank 26 with an appropriately shaped knife (preferably the knife described in patent application Ser. No. 37,301 filed concurrently herewith, the content whereof is incorporated herein by reference), the taped lens blank 26 can be removed, and a new lens blank to be taped can be positioned on the lens blank support surface 22 through the hole in the tape 18.

During such severing the increased air pressure in the opening 20 will not cause the lens blank support member 22 to move back toward its load position (which otherwise could partially strip the tape from the lens blank 26) due to the engagement of balls 80 between the conical end portion 78 of the pin 35 and the inner wall of the tube 32. After the taped lens blank 26 is removed and the new lens blank is inserted, however, the lens blank support member 22 can be caused to return to its load position by manual manipulation of the lever 82 which via the tube 34 lifts the balls 80 away from the conical end portion 78 of the pin 35, allowing them to move away from the wall of the tube 32, and the lens blank support member 22 to return to its load position under the influence of the springs 70. The clamp assembly 30 can then be released, the tape 18 can be advanced so that a new portion 16 of the tape 18 covers the opening 20, and the clamp assembly 30 can again be closed to repeat the taping cycle.

We claim:

1. A device for applying pressure sensitive adhesive coated tape smoothly over a first major surface of a lens blank, said device comprising:
   a tape support member having a tape support surface adapted to support a portion of a said tape and having a generally central opening through said tape support member;
   a lens blank support member within said central opening having a lens blank support surface adapted to support a said lens blank with the first major surface of a said lens blank adjacent said tape support surface;
   means for clamping a portion of a said tape to said tape support surface over said opening;
   means mounting said support members for relative movement to afford movement of said support surfaces toward each other from a load position at which load position said support surfaces are spaced from each other to afford positioning a said lens blank on said lens blank support surface and positioning a portion of a said tape on said tape support surface over said opening with the first major surface of the lens blank spaced from the tape so that such movement will cause the first major surface of the lens blank to progressively contact the clamped portion of the tape and cause the tape to be smoothly applied across the first major surface of the lens blank;
   means for providing an air tight seal between said support members;
   means for lowering the air pressure in said opening between said means for providing a seal and a portion of a said tape clamped to the tape support surface so that atmospheric air pressure acting on said lens blank support member and the portion of the tape will provide a force to cause relative movement between the support members which force decreases as the tape is applied to the major surface of the lens blank; and
   means for biasing the support members toward their load position with a force that together with the force applied by tension in the portion of the tape about equals the force exerted by atmospheric air pressure when the tape is fully applied to stop relative movement of the support surfaces.

2. A device according to claim 1, further including means for releasably retaining said support members in their position at which the tape is fully applied to the major surface of a said lens blank.

3. A device according to claim 1 wherein said device further includes means for rotatably supporting a supply roll of a said tape adjacent one edge of said tape support surface.

4. A device according to claim 1 wherein said device is adapted for applying pressure-sensitive adhesive coated tape from a supply length of the tape having a liner releasably adhered thereto, which supply length is wound about a core, and further includes means for rotatably supporting a said core adjacent one edge of said tape support surface, and means for removing a said liner from the supply length of tape moving between said wound supply length and said tape support surface.

5. A method for applying pressure-sensitive adhesive coated tape smoothly over a first major surface of a lens blank, said method comprising the steps of
   providing a tape support member having a tape support surface and having an opening generally centrally through the tape support member, and a lens blank support member within the central opening having a lens blank support surface adapted to support the lens blank with the first major surface of the lens blank adjacent the tape support surface;
   positioning the lens blank on the lens blank support surface with the first major surface of the lens blank adjacent and spaced from the tape support surface;
   positioning a portion of the tape on the tape support surface over the opening;
   clamping the portion of the tape to the tape support surface; and
   moving the support members relative to each other to move the support surfaces toward each other so that the first major surface of the lens blank will contact the clamped tape portion and cause the tape to be smoothly applied to the first major surface of the lens blank, said moving step including the steps of:
      lowering the air pressure in the opening between the lens blank support member and the clamped tape portion so that atmospheric air pressure acting on the lens blank support member and the tape portion will provide a force to cause the relative movement which force decreases as the tape is applied; and
      biasing the support surfaces away from each other with a force that together with the force applied by tension in the portion of the tape about equals the force exerted by the atmospheric air pressure when the tape is fully applied to stop relative movement of the support surfaces.

6. A method according to claim 5 further including the steps of releaseably retaining the support members in their relative positions at which the tape is fully applied to the first major surface of the lens blank.

7. A method according to claim 5 or claim 6, further including subsequent to said moving step, the step of cutting the tape portion around the lens blank and removing the lens blank.

8. A device according to claim 1 wherein said relative movement of said support members is vertically oriented, one of said members has a wall defining a vertically oriented cylindrical opening, the other of said members includes a pin projecting vertically into and centered within said opening and having a conical distal end portion, and said device includes a plurality of balls retained in said opening around said conical end portion so that said balls will allow movement of said support members to apply said tape, but will jam between said conical end portion and said walls to prevent movement of said support members back to said load position.

* * * * *